W. B. WESCOTT.
METHOD AND APPARATUS FOR PRODUCING MOTION PICTURES.
APPLICATION FILED JUNE 20, 1914.

1,309,672.

Patented July 15, 1919.
11 SHEETS—SHEET 1.

Witnesses:

Inventor:
William B. Wescott,
by Roberts, Roberts & Cushman,
Attorneys.

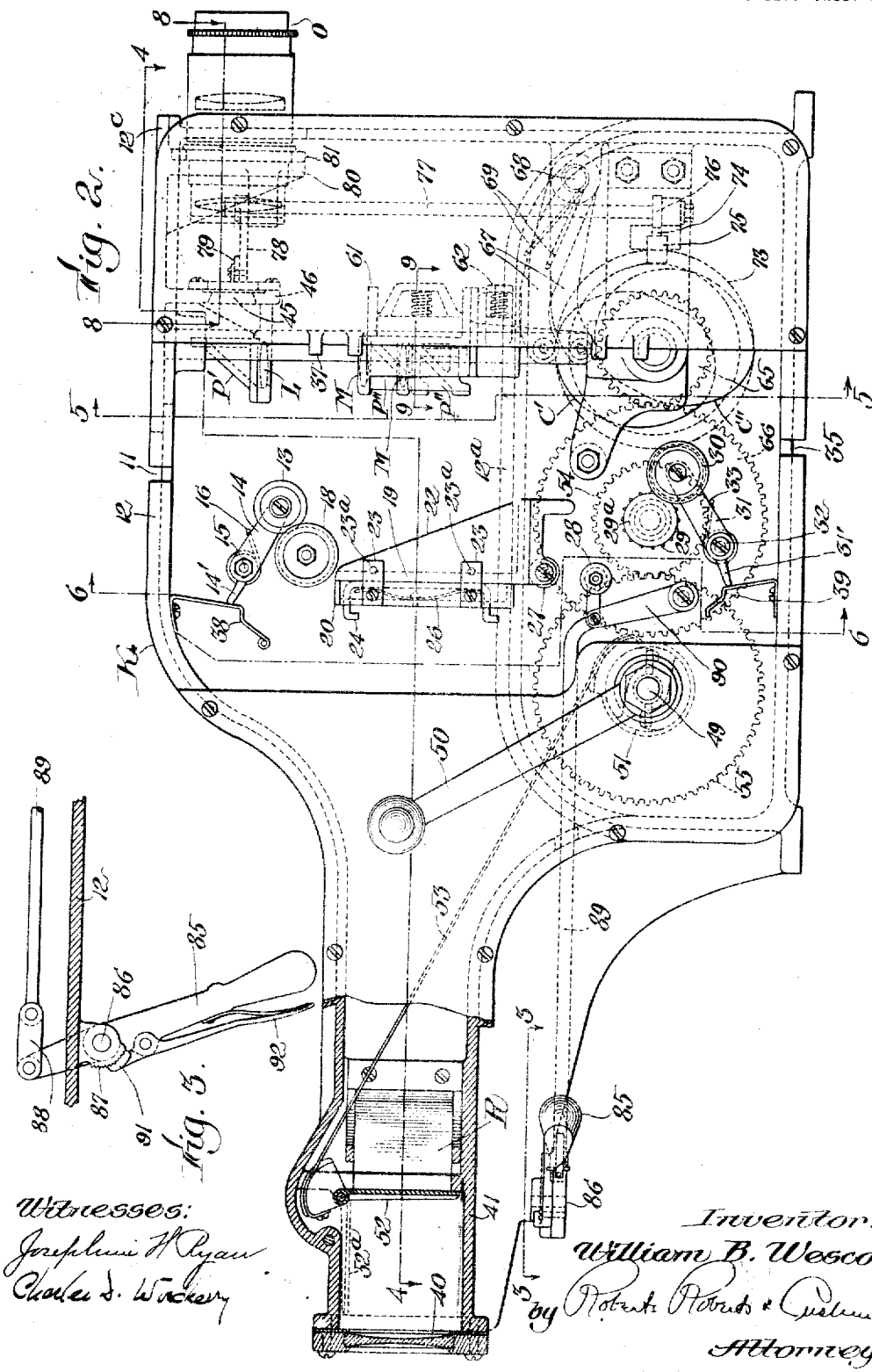

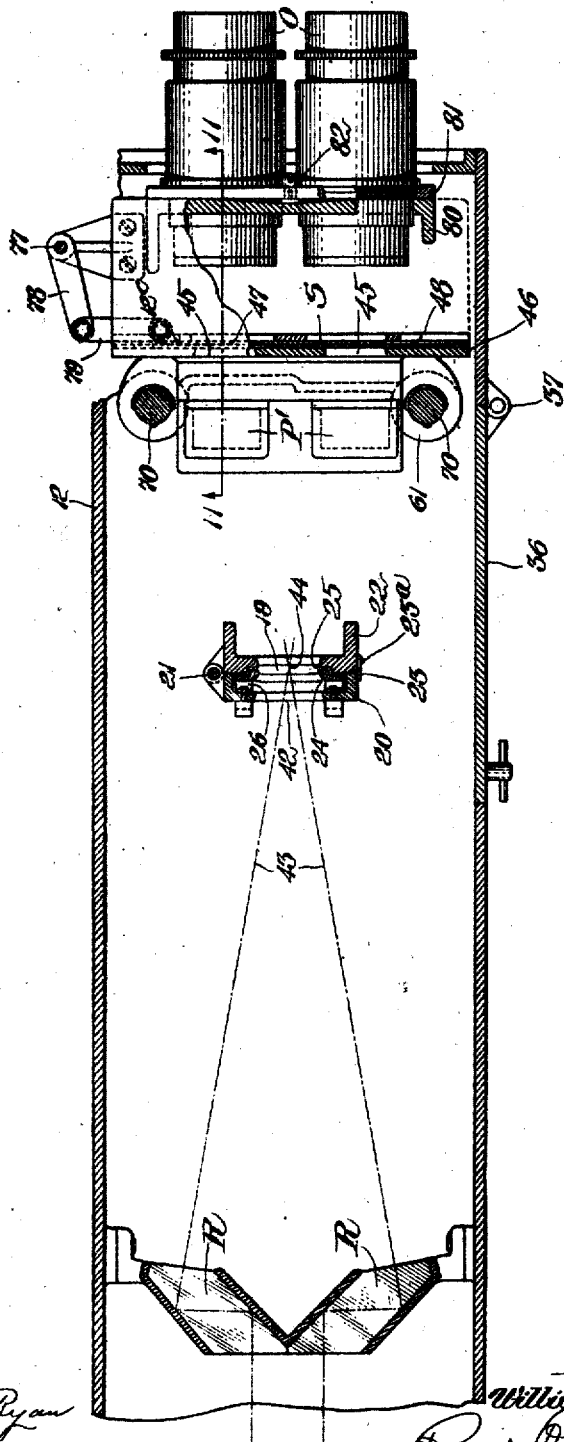

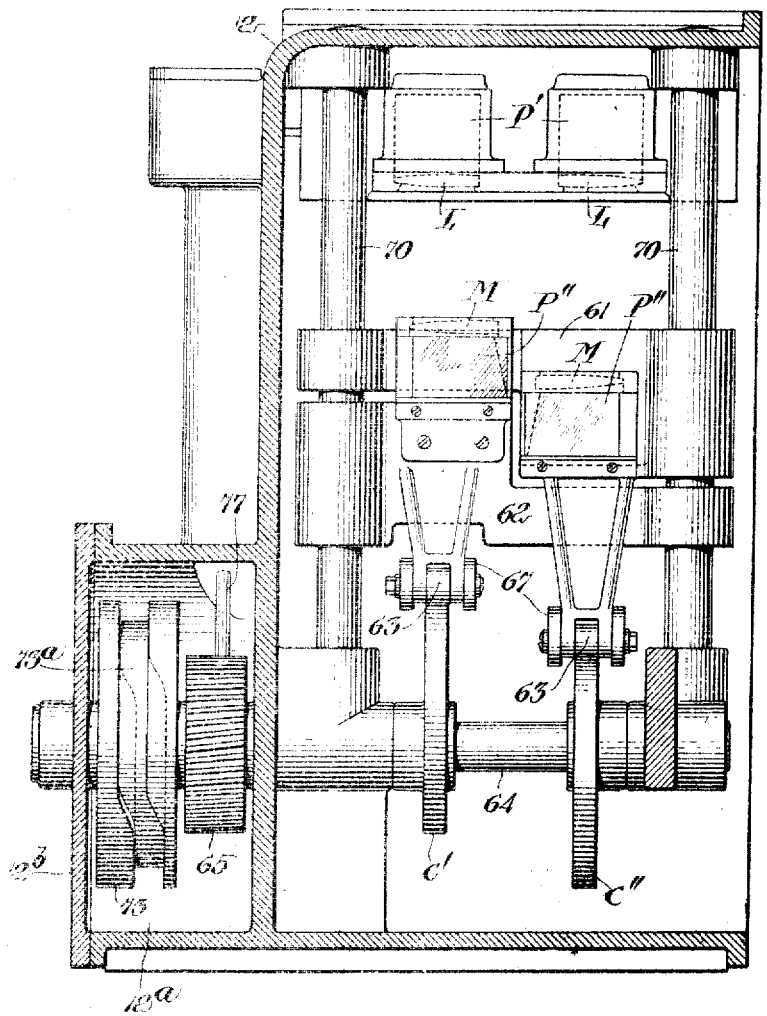

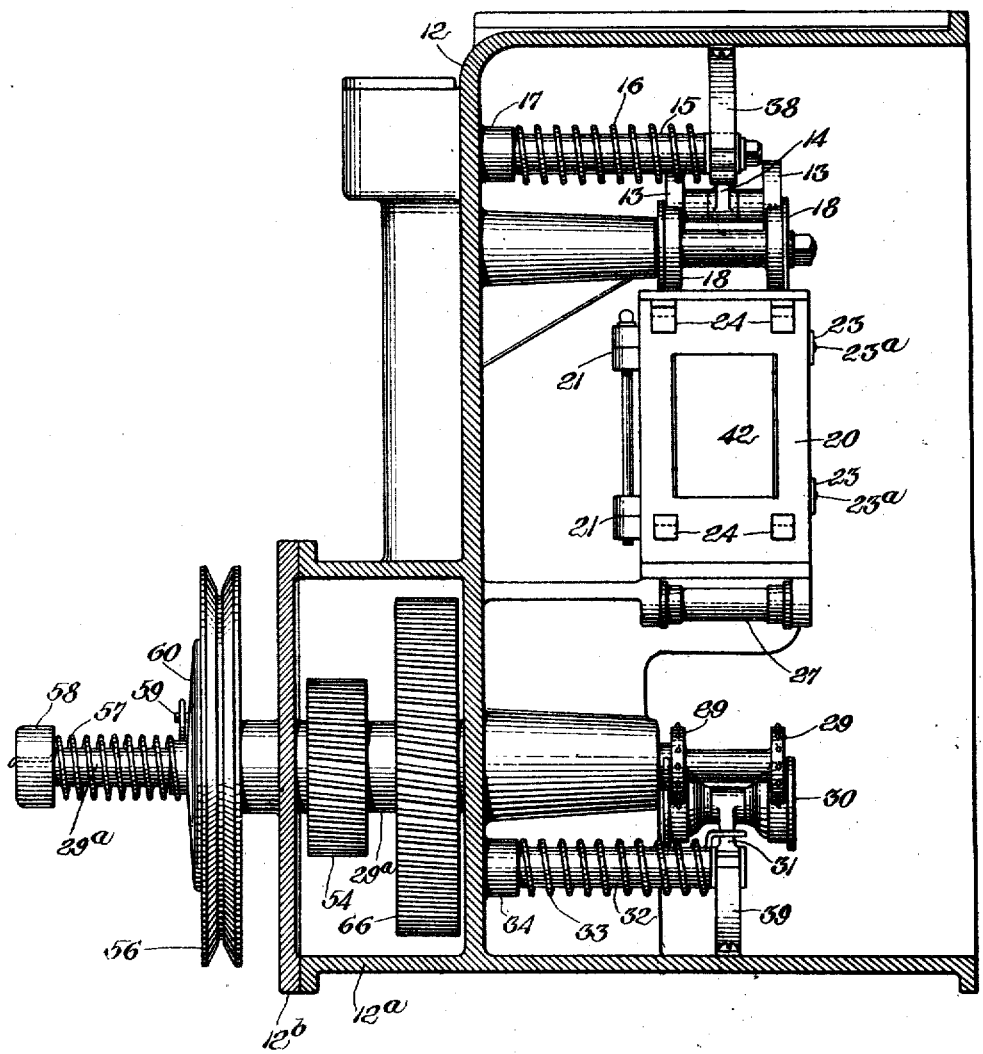

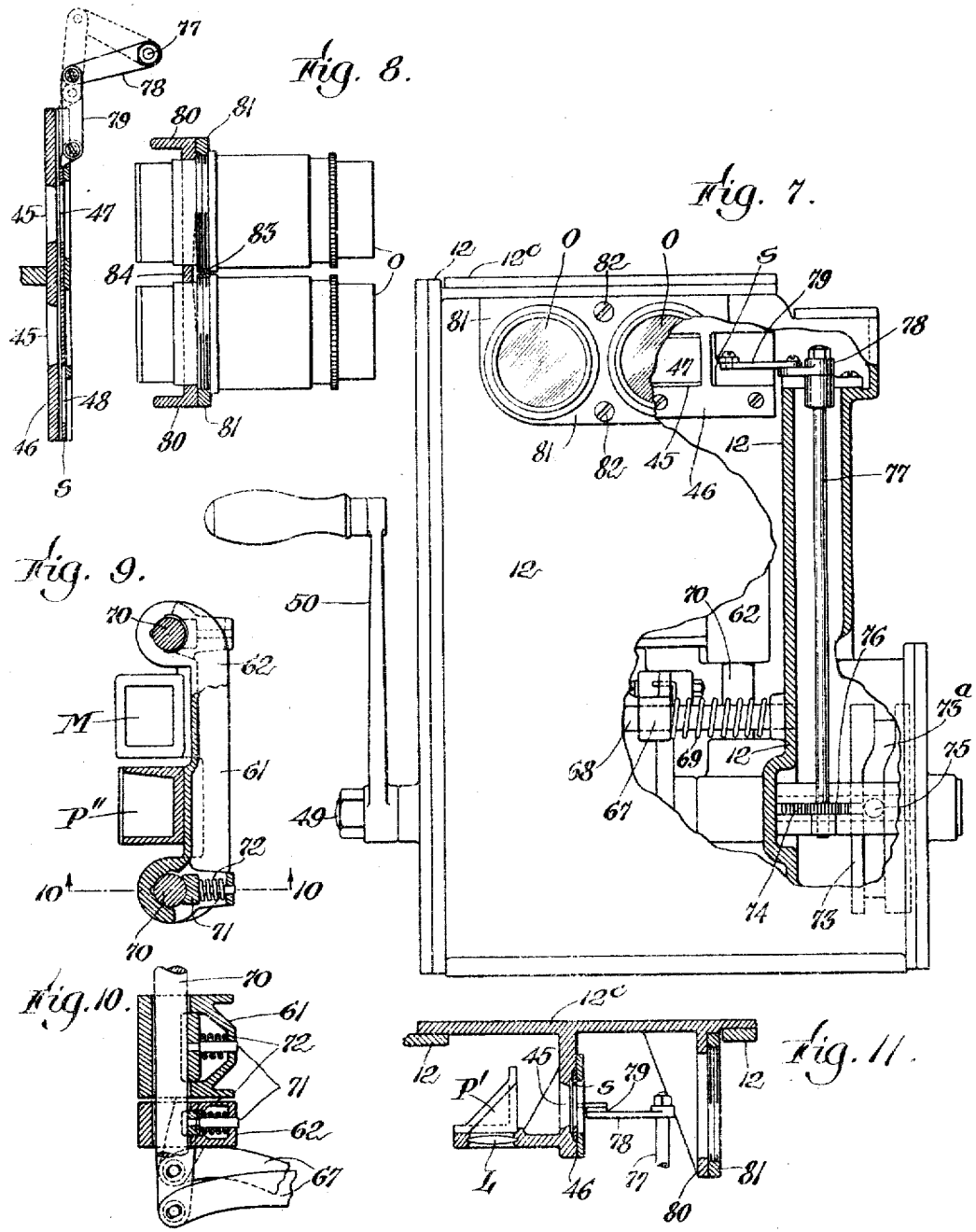

W. B. WESCOTT.
METHOD AND APPARATUS FOR PRODUCING MOTION PICTURES.
APPLICATION FILED JUNE 20, 1914.

1,309,672.

Patented July 15, 1919.
11 SHEETS—SHEET 7.

Witnesses:
Josephine H Ryan
Charles S Woodbury

Inventor:
William B. Wescott,
By Roberts, Roberts & Cushman,
Attorneys.

W. B. WESCOTT.
METHOD AND APPARATUS FOR PRODUCING MOTION PICTURES.
APPLICATION FILED JUNE 20, 1914.

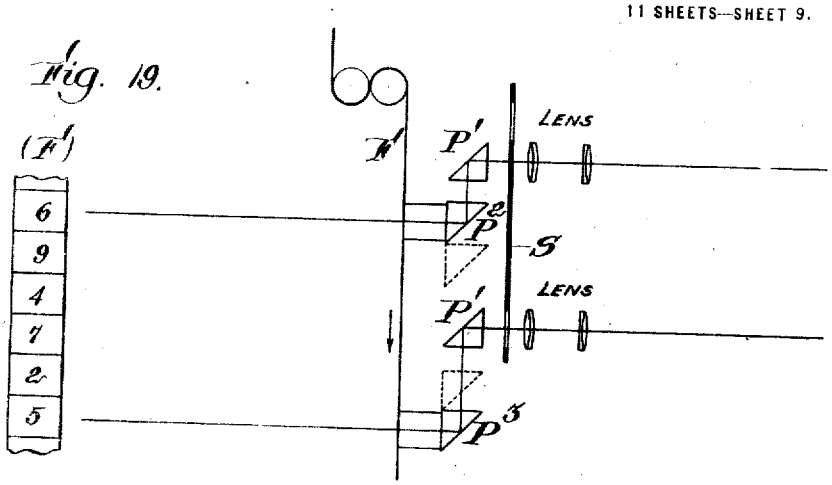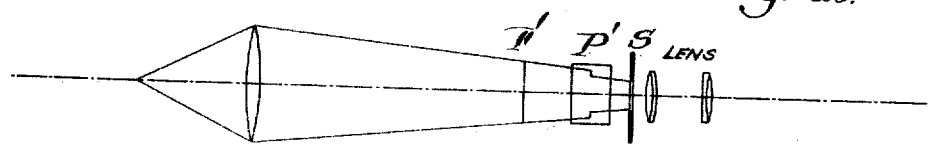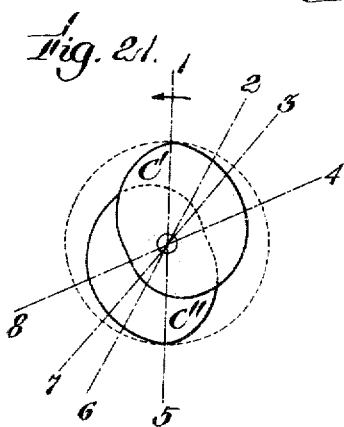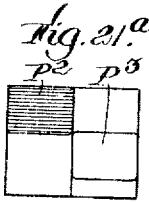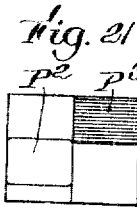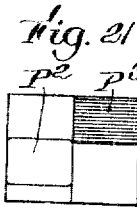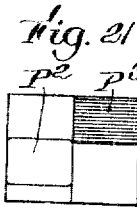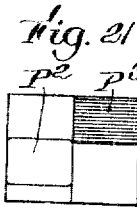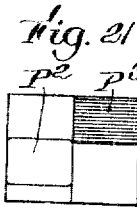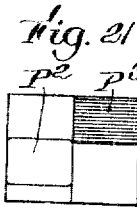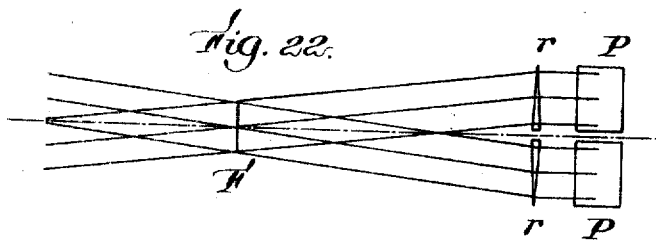

W. B. WESCOTT.
METHOD AND APPARATUS FOR PRODUCING MOTION PICTURES.
APPLICATION FILED JUNE 20, 1914.
1,309,672.
Patented July 15, 1919.
11 SHEETS—SHEET 10.
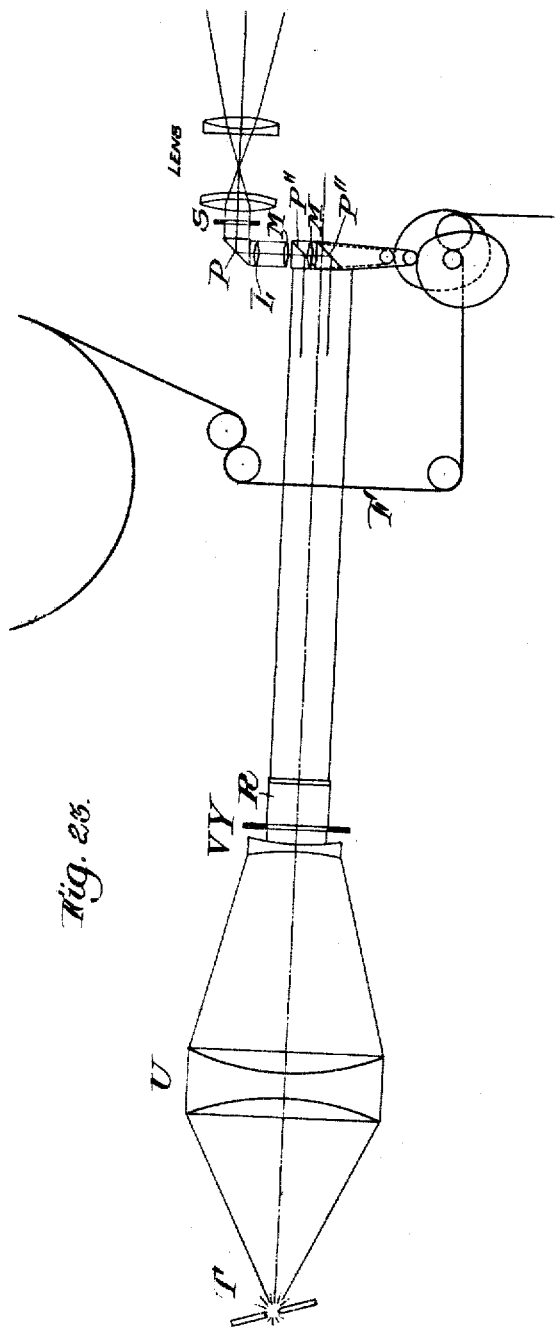
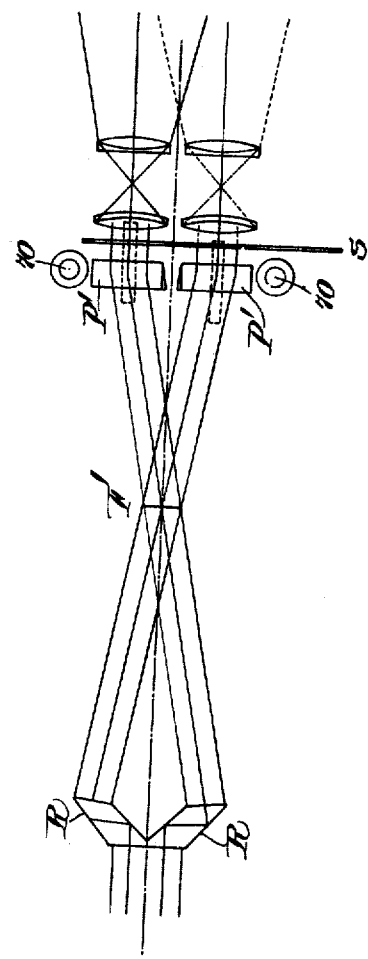
Fig. 25.
Fig. 24.
Witnesses:
Inventor:
William B. Wescott,
by Roberts, Roberts & Cushman
Attorneys.

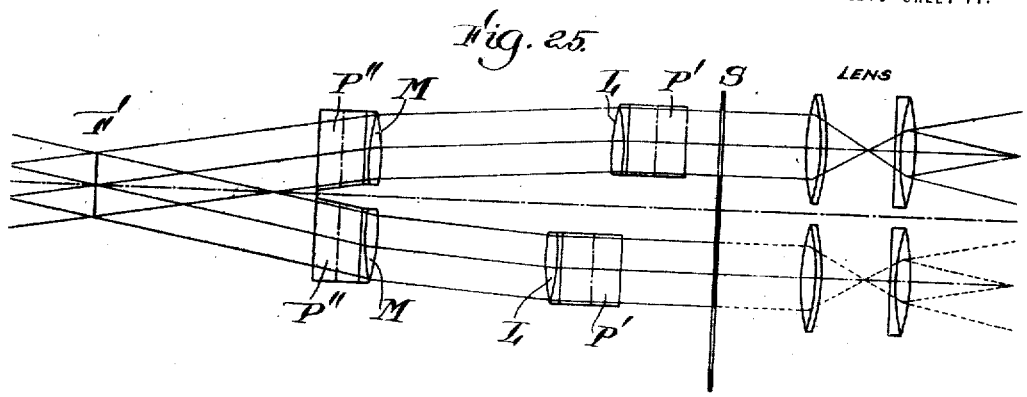
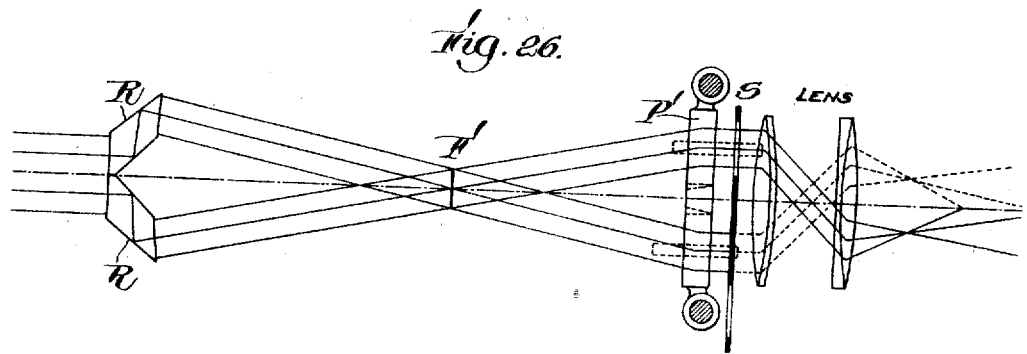
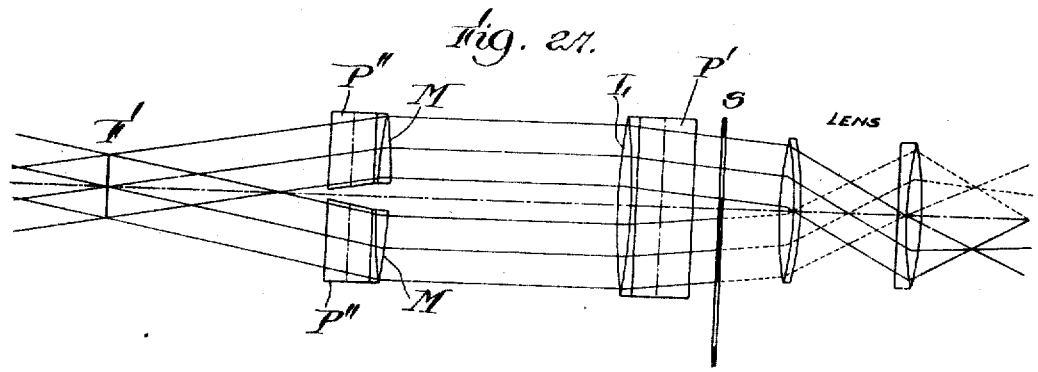

UNITED STATES PATENT OFFICE.

WILLIAM BURTON WESCOTT, OF BOSTON, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

METHOD AND APPARATUS FOR PRODUCING MOTION-PICTURES.

1,309,672.  Specification of Letters Patent.  Patented July 15, 1919.

Application filed June 20, 1914. Serial No. 846,224.

*To all whom it may concern:*

Be it known that I, WILLIAM BURTON WESCOTT, a citizen of the United States, and resident of Boston, in the county of Suffolk and State of Massachusetts, have invented new and useful Improvements in Methods and Apparatus for Producing Motion-Pictures, of which the following is a specification.

Cinematographic projection with motion picture machines or cinematographs of the kind now in almost universal use, consists in the projection on a screen of a series of pictures in rapid succession. These pictures are generally taken upon a single narrow flexible ribbon known as a film. The projection consists in general in projecting upon a mat surface screen the image of a picture exposed or framed in the film gate to the convergent beam of light from the lamp house condenser, then interposing a shutter somewhere along the optical path of the condenser at a point usually in front of the projection lens objective, and stepping the film along to frame the next picture of a series, and then removing the shutter to permit the image of the next picture to be projected upon the screen.

The ratio of the time of rest to the time of motion is usually about five to one, that is, it is customary to project 16 pictures in each second of time, allowing .05 seconds rest for each picture and about .01 seconds for the step motion. Hence the screen presents to the eye 16 pictures a second, of .05 seconds each duration, with dark intervals of .01 seconds each; this appears to be practically the high limit of speed for step-by-step or intermittent projection. Greater speeds subject the film to excessive wear and seriously shorten their service life, and produce displacements of the picture due to projector vibrations, which are noticeable as a flicker on the screen.

A sufficiently rapid succession of light stimulations produces the effect in consciousness of a uniform stimulus of less intensity. The cinematographic illusion of motion is produced by displaying as above described a series of pictures of moving objects taken at short intervals, and producing by "persistence of vision" and "fusion" the impression of a picture in which all the stationary objects are at rest and in which the moving objects take up different positions with relation to the objects at rest and are perceived as though in motion. The pictures in the series differ from each other only by the slight displacements of the moving objects. The persistence of vision, or after-image, results from the fact that the motion set up in the nervous mechanism upon each stimulation continues after the stimulation ceases, and one of the most important consequences of the inertia of the nervous mechanism, and the resultant after-images, is the fusion of stimuli which follow each other in rapid succession, or the blending of the after-images. Thus to use a familiar illustration, we find that a rocket or whirling light is seen as a line of light due to the impression persisting after the stimulation has moved to another part of the retina or is no longer present, and due to the fusion of the after-images.

The use of the intermittent motion picture machine causes serious eye strain, one of the principal causes of which is "flicker" so-called. Flicker is due, among other causes, first, to incomplete fusion of the stimulation and the dark interval; second, to the failure of registration of the stationary components of the successive pictures. In addition to these causes, flicker may be due to intermittent or irregular stimulation by intense light from scratches or denuded portions of the film, but the flicker due to the first two causes is present even with a perfect film.

The sensation of flicker due to the first cause may be eliminated in intermittent projection by securing complete fusion of the stimulation and dark intervals. It is not practicable to make the step movement of the film in less than .01 seconds. Hence the dark interval is fixed, and it is customary to break up the longer stimulation period by the interpolation of other dark intervals of equal duration by means of appropriately related shutter wings.

The fact remains, however, that the retina, and the nervous system associated with it, react to stimuli which are not perceived. Hence the intermittent projection does not produce a steady effect on the retina although the effect in consciousness is that of a uniform stimulus. In order that the retinal stimulation should be continuous (except for the motion of objects in the picture which we wish to perceive) there should be no dark intervals, that is, there should be a constant illumination of the screen. In order to accomplish this, mechanism should be provided to move the film at a constant rate of speed and to compensate in some way for this motion so that the image on the screen will be unaffected by the motion, as it has been found impossible successfully to register the succeeding pictures when projected from alternate films in a dual intermittent machine.

The flicker due to imperfect registration occurs because very slight lateral displacements of the film cause corresponding lines in the projected image to move through such a distance that the retinal images do not coincide. If the motion is extremely slight so that a given line is displaced a distance no greater than its width, the effect would be merely a loss of sharpness of definition, but if the motion is of such magnitude that a given dark line moves in a bright field a distance greater than its width, the retinal images which should coincide are separated by a bright line and a distressing flicker results. This kind of flicker may be obviated by moving the film along its path with great precision, so that the lateral displacement is kept down to the order of thousandths of an inch. Obviously greater precision of movement is to be had with a film subjected to a constant and uniform tension and moving with uniform speed than is possible with the step-by-step or intermittent motion.

Not only does the uniform motion of the film permit the elimination of the tremble flicker but it is essential to the non-intermittent display of a standard film.

Furthermore, as the film will be subjected to far less wear and tear, without any sudden stopping or starting, and without any heavy spring tension in the film gate, it is possible greatly to increase the speed and consequently the number of pictures. The display of pictures taken at much shorter intervals than is customary will eliminate the appearance of jerkiness which is particularly noticeable in step-by-step motion pictures of fast moving objects near the camera; that is, when the moving object subtends a large angle at the camera lens between pictures, the after images of the projected pictures do not blend smoothly to show the similitude of natural motion, but produce in consciousness the sensation of jerkiness. This can be largely overcome in a uniform motion machine.

The object of the present invention is to provide a new and improved method of projecting motion pictures from a continuously moving film, and also to provide a steady cinematograph or motion picture machine which operates according to the new method, adapted to produce constant illumination and a steady picture, and to permit higher speeds than is possible with motion picture machines of the intermittent type now in general use. In performing my invention the film is moved at a constant rate, and this movement is compensated for in such way that the image projected upon the screen is unaffected by the movement.

In the accompanying drawings which illustrate one embodiment of a cinematograph or motion picture machine exemplifying the invention,—

Fig. 2 is a side view on an enlarged scale and partly in section illustrating the motion head containing my invention;

Fig. 3 is a sectional view on line 3—3 of Fig. 2;

Fig. 4 is a sectional view partly in plan on line 4—4 of Fig. 2;

Fig. 5 is a sectional view on line 5—5 of Fig. 2;

Fig. 6 is a sectional view on line 6—6 of Fig. 2;

Fig. 7 is a front view of said motion head, parts being broken away to show parts of the interior mechanism in elevation;

Fig. 8 is a sectional view partly in plan on line 8—8 of Fig. 2;

Fig. 9 is a sectional view partly in plan on line 9—9 of Fig. 2;

Fig. 10 is a sectional view on line 10—10 of Fig. 9;

Fig. 11 is a sectional view on line 11—11 of Fig. 4;

Fig. 19 is an illustrative diagram in side elevation showing an embodiment of the principle illustrated in Fig. 12 and hereinafter described;

Fig. 20 is an illustrative diagram in plan of Fig. 19;

Fig. 21 is a diagrammatic illustration of the relation of the cams for actuating the reflectors shown in Fig. 2;

Fig. 21ª to 21ʰ are illustrative diagrams showing the relation of reflectors as produced by the motion of the cams illustrated in Fig. 21;

Fig. 22 is an illustrative diagram showing "side by side" reflectors and oblique beams further illustrated in the remaining figures;

Fig. 23 is a diagrammatic view in side elevation, showing the optical train of the machine embodying my invention illustrated in Figs. 1 to 11;

Fig. 24 is a diagrammatic view in plan of Fig. 23;

Fig. 25 is a diagrammatic development in plan, of Figs. 23 and 24;

Fig. 26 is a diagrammatic view in plan showing the optical train illustrated in Fig. 23 provided with a single objective; and Fig. 27 is a diagrammatic development of Fig. 26.

Figure 12:
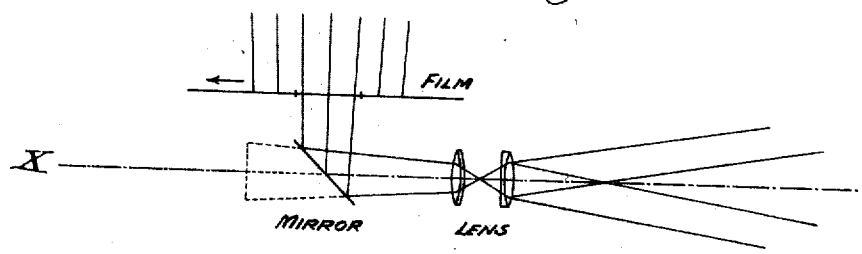
Fig. 12 is an illustrative diagram hereinafter described.

Referring first to the diagrammatic figures of the drawings for the purpose of explaining the optical principles involved in the invention, it will be understood that the motion of the film being in the direction of its length is at right angles to the optical axis in machines in which the elements are in general organized like those in common use. It is possible, however, to convert the motion of the image source (the film) from a motion at right angles with the optical axis to a virtual motion along the optical axis by placing a mirror or reflector at an angle of 45° with the optical axis and moving this mirror with the film. Thus in Fig. 12, if the film and mirror be moved together in the direction of the arrow, the optics of the system would be precisely the same as if the image source were back of the mirror and were moving away from the lenses along the projected axis. Hence, the effective luminous object is in the optical axis X, and its movement carries it farther away from the lenses and consequently from the screen upon which the lenses project the image. The word "lens" in the several diagrammatic figures is used to denote the projection objective.

In general, no matter what reflections or refractions the rays undergo along this path, the movement of the image source (the film) will produce a displacement of the rays either along their length or at right angles to their length, or both, and this will in general change the image in position or in magnitude, or both. Therefore, if no compensation were accomplished, the image on the screen could not possibly remain unchanged unless accurately parallel rays were used. A perfect lens would give parallel rays if a point source of light were placed at its focus. There are, however, no such point sources of light to be obtained, and calculation shows that the nearest approach to a point source, if sufficient intensity is had, is so large as to give rays which are very far from parallel.

One way to compensate for motion of the object is so to modify the length of a portion of the optical path that the total length of the path remains constant. (See Fig. 13). This method consists essentially in so moving two reflecting surfaces as to compensate for the motion of the image source.

Figure 13:
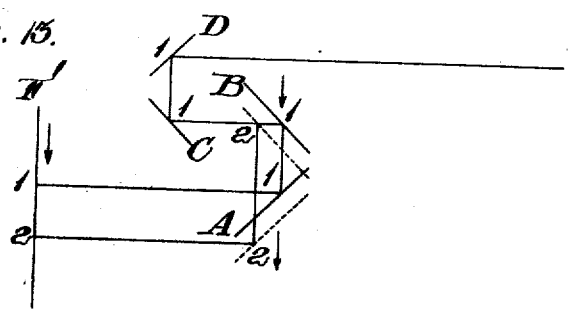
Fig. 13 is an illustrative diagram showing a method of compensating for the motion of the object which results both in a change of position and in a change of magnitude of the image due to a change in the length of the optical path.

In Fig. 13 a motion of the image source (film F) from position 1 to position 2, it being assumed that the light source is at the left of F, is compensated for by moving the reflecting surfaces A and B in the direction of the arrows. The motion should be one half that of the image source. C and D are fixed or stationary reflectors. A beam passing through the image source at point 1 of the film is reflected from point 1 of reflector A, upward to point 1 of reflector B, thence to point 1 of reflector C, thence to point 1 of reflector D, and thence through the lens to the screen. When the image source has reached position 2, and the reflectors A and B have been moved to dotted line positions in the manner above stated, the beam passes from point 2 of the film F to point 2 on reflector A, thence to point 2 on reflector B, thence to point 1 on reflector C, and thence to point 1 on reflector D, the lines from B to C, from C to D, and from D to the lens coinciding. It will be seen that the length of the paths from positions 1 and 2 of the film F, to point 1 on the reflector D, are equal. Thus the stationary and moving reflectors compensate for the motion of the image source, and the projected image of the moving image source remains fixed in both position and magnitude.

Figure 14:
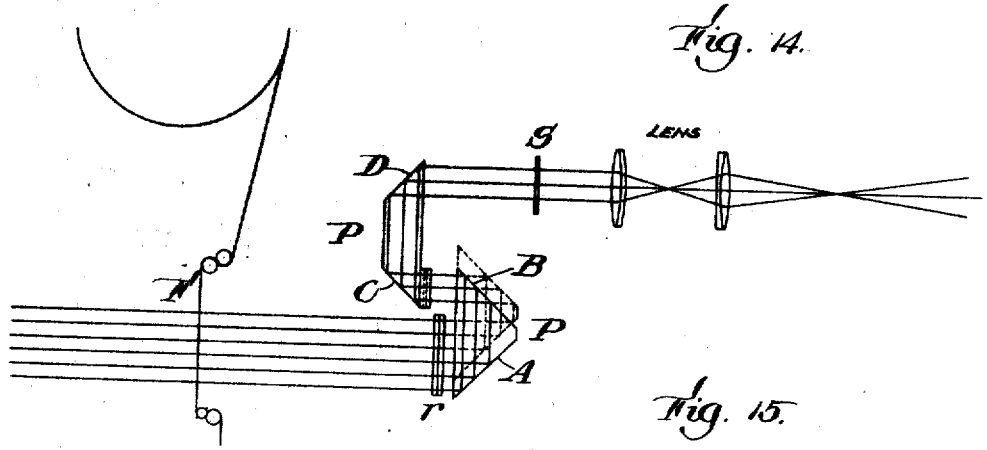
Fig. 14 is a diagrammatic view in side elevation, showing the optical train of a machine embodying my invention using the compensating method illustrated in Fig. 13.

A preferred arrangement of such a system is shown diagrammatically in Fig. 14 in which the reflecting surfaces A, B, and C, D, are parts of the same total reflection prisms P and P' respectively. In this arrangement it is obvious that the incoming and outgoing rays will in no way be affected by slight angular motions of the prisms. And a vertical reciprocating motion may be imparted to the surfaces A and B, which being parts of the same prism will not change their angular relation, by a cam motion, in the manner hereinafter explained.

It may be noticed here that while it is theoretically possible to use plane mirrors to reflect the image bearing beam of light, it is not in general practicable on account of the loss of definition due to surface reflection. If a silvered glass mirror is used the incident ray is in part reflected from the surface and in part reflected from the silvered face with a consequent double and less distinct image. The total reflection prism therefore is the most appropriate for this use. This prism is so shaped that the rays enter and leave in a direction normal or nearly normal, to the surface, so that all rays have the same length of path in the glass, and hence suffer no refraction or dispersion.

Figure 15:
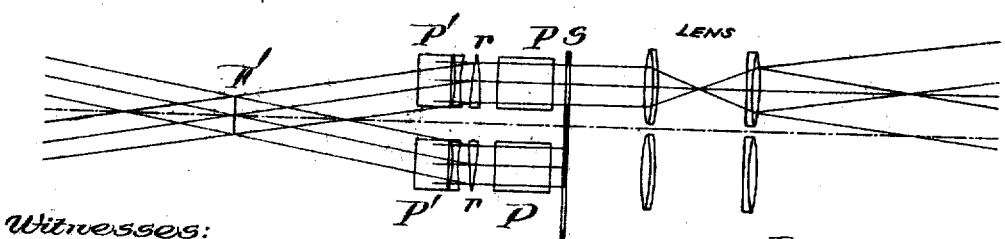
Fig. 15 is a diagrammatic view in plan showing the optical train illustrated in Fig. 14.

Fig. 15, the plan view of the diagram shown in Fig. 14, and the development diagram shown in Fig. 16, can be better explained and more readily understood, after further principles have been explained with the aid of later diagrams.

Another way to compensate for the motion of the object is to refract the light rays from the object so that all rays, in the cone of light from a point in the image source (the film), make the same angle with the optical axis of a fixed focusing lens and hence come to a corresponding point in its image plane.

Figure 17:
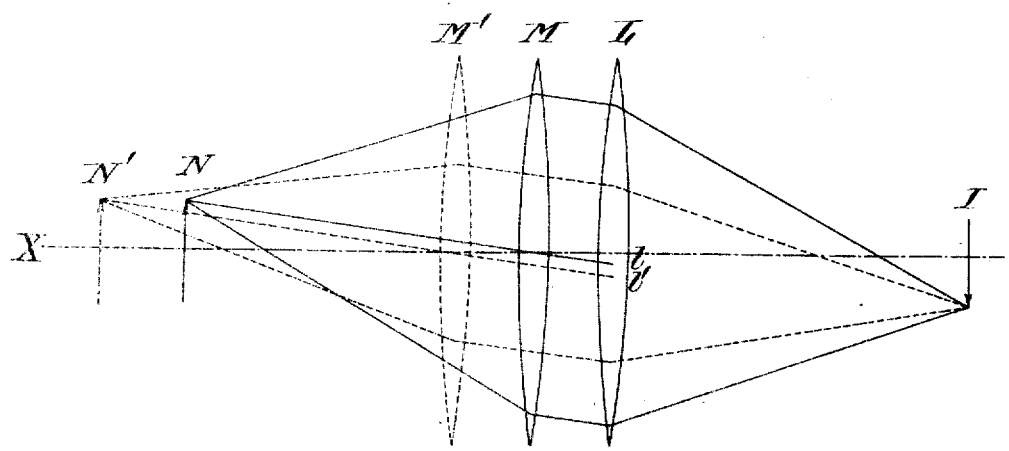
Fig. 17 is an illustrative diagrammatic view of a refraction method of compensating for the motion of the object.

Such compensation refraction may be obtained by means of a lens system the principle of which will be understood by reference to Fig. 17, in which L is a fixed lens with its principal focus in the image plane I (a screen), and M is a lens adapted to be moved with an object N (an image source) at its principal focus. Since N is at the principal focus of the lens M all rays in the cone from a point in the plane N will leave the lens M parallel to each other, and as all parallel rays reaching the lens L are refracted to a point in the image plane I an image of the object N will be produced at I. Now if the object N and the lens M be moved to the positions N' and M', N being maintained at the principal focus of M, then all the rays reaching L will have suffered a lateral displacement, as from $l$ to $l'$, but all the rays from a point in N will still reach L parallel to each other and the angle made between them and the optical axis X will be unchanged, hence the image I; will be unaffected both in position and size by the motion along the axis X of the object N.

Figure 18:
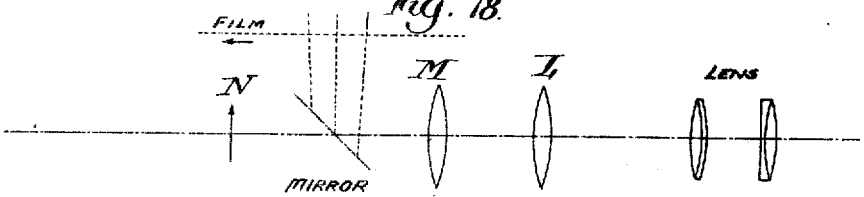
Fig. 18 is an illustrative schematic combination of the principles illustrated in Figs. 12 and 17.

If we now modify the optical system described above and illustrated in Fig. 12, by the addition of the motion compensating lenses M and L, Fig. 18, and move the lens M with the mirror and film in such a manner as to maintain the effective luminous object N at its principal focus, we have, beyond L for short motions (the lateral shift $l$—$l'$, Fig. 17, and the size of the lens L determine the maximum permissible motion) an image fixed in size and position and adapted to be focused upon any suitable screen by the objective lens, marked "Lens" in the drawing.

As we have already seen, in order to get a stationary image of a uniformly moving film picture it is necessary to have a mirror or reflector moving with the film. This reflector must travel with the film while it is reflecting the film picture and must then be returned to its starting point to take up another and later picture. If one picture is to take the place of another by dissolving or by rapid and progressive substitution, there must be at the time of change two pictures in potential register on the screen, that is, there must be one picture projected on the screen and another (the next to be projected) in register with the first, but shuttered. It is therefore necessary that a second reflector should carry the second picture during the time of the change of the pictures on the screen, and while the first reflector is in the act of returning. The relation of two such reflectors to each other at the time of change is illustrated in Figs. 19 and 20, which are diagrams showing two such alternating reflectors, no account being taken of the variations in the length of the paths of the rays, and no means being shown to compensate for or correct the same. Referring to Figs. 19 and 20, P' and P' represent two fixed total reflection prisms, projecting their rays through two separate lens systems, and $P^2$ and $P^3$ represent two reciprocating total reflection prisms. In the position shown in Fig. 19, picture #5 of the film F is exposed on the screen and the lower prism $P^3$ is near the end of its image-bearing travel; while the upper prism $P^2$ is bearing the image of the next to be exposed picture, #6, which is shuttered by the shutter S. Thus picture #5 is exposed and picture #6 is in potential register with #5 but is shuttered. It will be understood that as one of the prisms $P^2$ or $P^3$ moves down with the film F, and while its picture is exposed and the other shuttered, the other prism $P^2$ or $P^3$ is returned upward to take up the next picture in the series. As the lower prism $P^3$ approaches the end of its downward travel, (Fig. 19) the shutter S is moved in such a way as to progressively shutter picture #5 and expose picture #6. At all times during the shutter travel, therefore, the screen presents a complete picture, which is composed of a diminishing part projected from film picture #5, and an increasing part projected from film picture #6. At the completion of the shutter travel, when picture #5 is completely shuttered and picture #6 is completely exposed, the shutter stops until it is desired to accomplish another substitution. While the lower lens system is thus shuttered, the lower prism $P^3$ returns into position to take up the next film picture, #7. The shutter then accomplishes the next substitution of picture #7 for picture #6, by returning to its original position, thus progressively shuttering picture #6 which is projected through the upper lens system, and progressively exposing picture #7 through the lower lens system.

Hence there will be in register on the screen, at the time of shuttering, the picture being shuttered and the picture being exposed, and during exposure, we have the last-exposed picture shifted out of, and next-to-be-exposed picture shifted into, potential register with the picture then being exposed.

That the reflectors may travel together and with the film during the substitution period, one returning thereafter to the starting position while the other continues its image-bearing travel with the film, their motion must be controlled by some type of cam mechanism. Two similar cams, C' and C'', adapted to move the reflectors in the manner above described, are shown mounted on the same shaft, in Fig. 21, one being 180° in advance of the other, cam C'' controlling reflector P², and cam C''' controlling reflector P³.

The relative positions of the reflectors as controlled by these cams, at different stages of their travel are shown diagrammatically in Figs. 21ª to 21ᵇ, where for the sake of clearness and for other reasons later to be explained, the reflectors are shown side-by-side rather than one above the other as in Figs. 19 and 20.

In Fig. 21ª the reflector P² is shown at the upper end of its travel in cam position C'—1 (Fig. 21) and shuttered, and P³ is nearing the lower end of its image-bearing travel, in cam position C''—1. In cam position C'—2, P² (Fig. 21ᵇ) has been accelerated from rest, position C'—1, to constant speed synchronous with P³ and has brought the image-beam it carries, into potential register with the picture carried by P³ and exposed on the screen.

Between cam positions C'—2 and C'—3 (Fig. 21) while P² and P³ are moving synchronously at constant speed, P³ is progressively shuttered and P² is progressively exposed, as explained above. Fig. 21ᶜ shows the reflector relation in cam position C'—3 at the completion of the shutter travel, at which time P² is carrying the exposed image-beam and P³ is shuttered, and ready to be slowed down to rest in cam position C''—4, (Fig. 21ᵈ). From cam position C''—4 to C''—5, P³ is returned to rest at its upper position (Fig. 21ᵉ) and is then carried through a cycle of relations, P³ to P² as shown in the remaining figures, Figs. 21ᶠ, 21ᵍ and 21ʰ, exactly corresponding to the relations of P² to P³ as just described, and illustrating cam positions 6, 7 and 8 (Fig. 21).

It will be observed that the reflectors P² and P³ shown in their respective relations in cam positions 1 to 8, have their reflected images exposed during the major but central part of their downward travel only. That is, the reflector is set in motion by the cam and accomplishes part of its travel, (during which it is accelerated from rest to constant speed) before its reflected image is permitted to reach the screen, and is shuttered before it begins to slow up for the stop preliminary to its rapid return to the upper starting position. Thus the vibrations due to acceleration and inertia occur during that portion of the travel in which the reflector is shuttered.

The standard cinematographic film is composed of a series of photographic positives disposed along its length in the order in which they were taken and obviously in the order in which they must be projected to and displayed upon the screen. But it will be noticed in considering Figs. 19 and 20, that the pictures on a film F, suitable for display by such a system cannot be spaced consecutively, but because of the recovery space required by the reflectors P², P³, one above the other, they must be spaced in some such non-consecutive order as shown.

There are serious objections, however, to the modification of the standard film and beyond pointing out its adaptability to the length of path compensation method described, we will hereafter consider solely the projection of pictures as arranged on the standard film.

A curious geometrical difficulty enters at this point, for unless the moving reflectors, two or more in number, move in a circular or some other closed path, that is, if the reflectors simply move back and forth with a reciprocating motion along the direction of the film, one of the reflectors, on the way back inevitably gets in the way of the light going to the other.

Apparently the only geometrical method of overcoming this difficulty—the interference of reciprocating reflectors used with a standard film—consists in passing the light through the film picture as from a divergent source of light at the picture and preferably as in Fig. 22 where the light is shown as beams of nearly parallel rays passing through the film F, not quite at right angles to its surface but at an angle of a few degrees.

One beam might be used and its angle reversed for succeeding pictures thus transferring the beam from one reflector to the other and effecting a progressive substitution without shutter. Preferably, however, two beams are used, each making such an angle with the perpendicular to the film surface that they are soon far enough apart to admit of two reflectors P and P arranged side by side (Fig. 22) being moved up and down without getting in each other's way; the beams reaching them being first brought into parallelism by the two prisms r.

Figure 16:
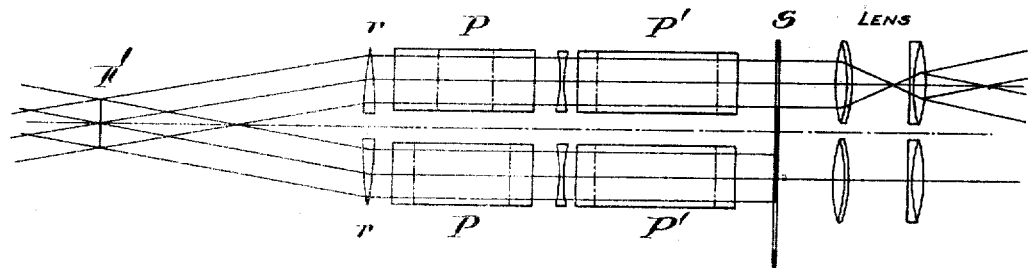
Fig. 16 is a diagrammatic development in plan of Figs. 14 and 15.

This principle of divergent or oblique beams from the film to a pair of side-by-side reciprocating reflectors, as applied to the compensating method illustrated in Figs. 13 and 14, will be understood by reference to the plan diagram in Fig. 15 and the development diagram in Fig. 16. The divergent beams pass from the film through the refracting prisms r, r, by which the beams are brought into parallelism, thence to the two, side-by-side, reciprocating, total reflection prisms P, P, thence to the two, side-by-side, stationary total reflection prisms P', P', in the manner already described, and thence through the objective lenses, of which there may be a separate set for each train of reflectors. Shutter S is actuated so as alternately to expose and shutter the beams of the two optical trains.

While achromatized prisms, attached to and moving with the reflectors P, P, or stationary and of sufficient length to cover the reflectors during their travel, will remove the obliquity of the image, I prefer to permit the beams to reach the reflectors unrefracted and to use compensation refraction means adapted to maintain the center of the virtual image on the optical axis of the objective lenses, whether one or two objectives are used.

In the case of the constant length of path maintaining system described above and illustrated schematically in Fig. 13, simple prisms r are shown in the side elevation (Fig. 14,) in the plan, (Fig. 15,) and in the plan development (Fig. 16). In practice of course, these prisms would be achromatized.

In place of the compensating method illustrated in Figs. 13 to 16, for maintaining a constant length of path, the principle of the compensating lenses M, L, (Fig. 17) as applied to the divergent or oblique beam scheme of Fig. 22, is shown in Figs. 23, 24 and 25. In these diagrams the divergent beams pass through the film F to the two, side-by-side, reciprocating, total reflection prisms P'', P'', thence to the two, side-by-side, stationary, total reflection prisms P', P', and thence through shutter S to the objective lenses. Directly above each moving reflector P'' is a compensating lens M, fastened to and moving with its reflector P''. Fixed lenses L, L, are mounted under and fastened to the fixed reflectors P', P'. The compensating effect will be understood by reference to the explanation of Figs. 17 and 18.

These compensating lenses M, may either be so corrected as to give a very flat field or may be less highly corrected lenses, or rather sections of lenses, having their centers in such relation to the image source F that the center of the virtual image is on the optical axis of the objective lenses. Fig. 24 shows a partial plan view of the system illustrated in Fig. 23; and Fig. 26 shows, in plan view, a similar system, of which Fig. 27 is a development, in which the fixed reflectors are shown as a single reflecting prism P'' with a single stationary lens L instead of the two prisms P' and two lenses L shown in Figs. 23 to 25. In this case each moving lens M is a section of a lens having its center on the center line of the film F, and the optical axis of the objective lens. There is a single set of objective lenses instead of two sets as before. In each case the lenses M are of such focal length that the object, film picture F, is at the principal focus of each.

Among several methods of obtaining the oblique beams by which the film picture may be made the virtual source of divergent rays, the preferred system consists in the double total reflection prisms R (or equivalent mirrors), placed behind the film F in the path of parallel or nearly parallel rays, and at such point that the resultant beams cross each other at the film, as shown in Figs. 23, 24 and 26 of the diagrams. Said rays pass from a light source T (Fig. 23) through condenser U, and concave lens V, from which a beam of nearly parallel, or very slightly convergent rays passes through diaphragm Y to the double total reflection prisms R. The prisms R, R, split the beam into two beams, as indicated, which cross at the film F, and thence pass as already described to the moving reflectors.

Having now explained the essential optical and mechanical principles involved in the invention, I will proceed with the description of a motion picture machine in which these principles are embodied, using for this purpose a machine organized in accordance with the system illustrated in Figs. 23 to 25, that is, a system including oblique or divergent beams from the film, side-by-side stationary and moving reflectors, and the fixed and movable lens method of compensating for the motion of the film.

Figure 1:
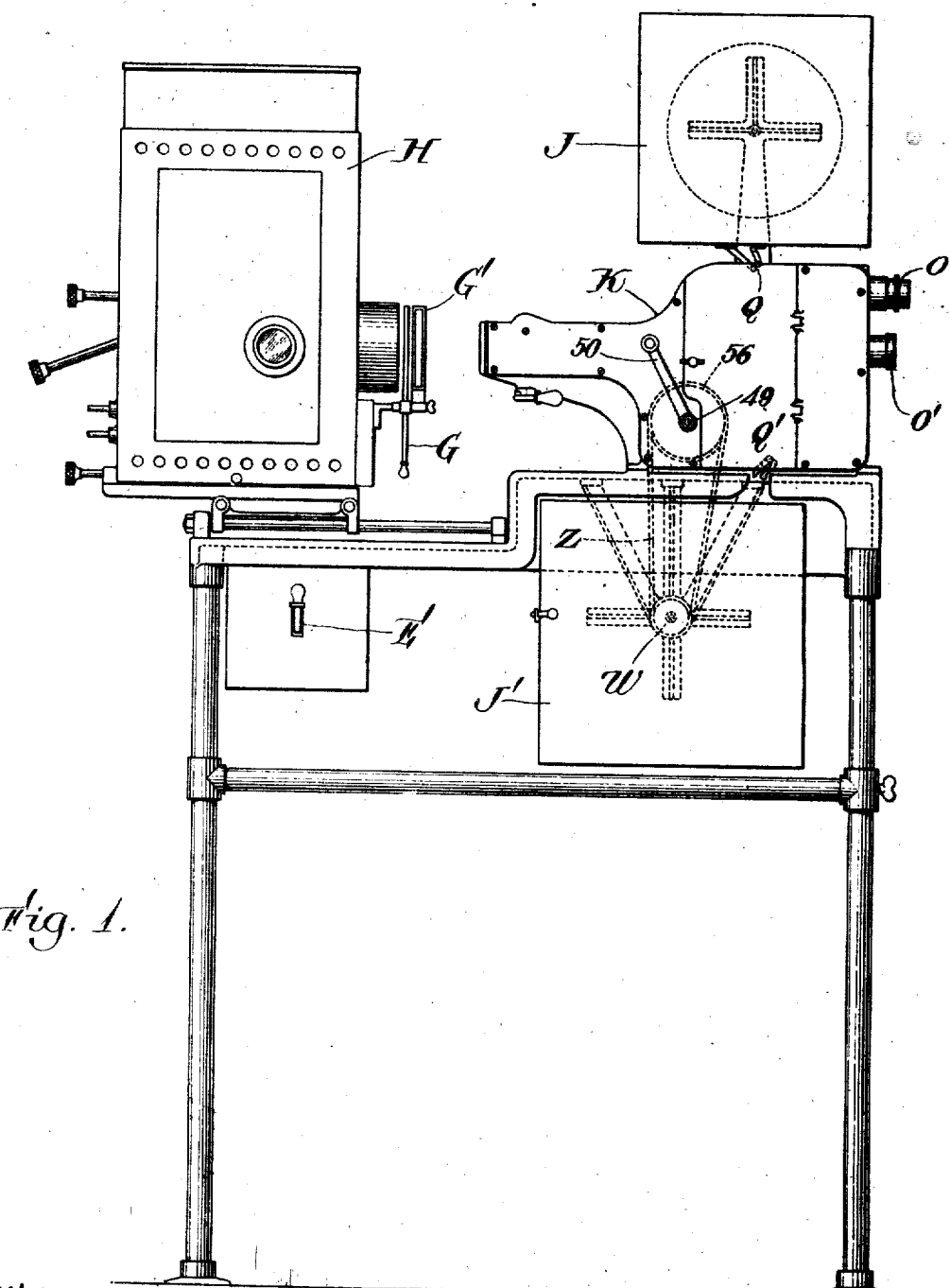
Figure 1 is a side view of an optical lantern as a whole, containing the invention.

In Fig. 1, H is a lamphouse of the ordinary Fire Underwriters' type, with its current controlled at E, G being a swinging shutter suitable, for use with the slide frame G', for ordinary projection through the stereopticon objective O'. J and J' are respectively the feed reel and take-up reel magazines. Fire traps of any approved type may be used at Q and Q' where the film enters and leaves the motion head. K is the cinematograph motion head, containing the invention, through which the film in its travel from the feed reel in magazine J to the take-up reel in magazine J', passes. The film enters the motion head K, through fire trap Q, and the slot 11 in the main housing 12 (Fig. 2); and thence passes under the pressure rollers 13 (Figs. 2 and 6) which engage the margins of the film and are supported by the arm 14 pivoted on the pin 15, about which is coiled the helical torsion spring 16, which acting between the boss 17 on the main housing frame 12 (Fig. 6) and the arm 14, presses the rollers 13 against the guide rollers 18 over which the film passes to the film-gate 19 (Figs. 2, 4 and 6). The film-gate may be of any suitable type such as the well-known form shown, in which the door 20 is adapted to swing on the hinge 21, and to lock against the fixed member 22 by the engagement of the catches 23, with the pins 23ª, and in its locked position to press the shoe 24 against the film in the groove 25 by means of the springs 26.

The film is thus guided through the film-gate by the just mentioned groove 25, which prevents lateral motion, and is held flat by the pressure shoe 24. After leaving the film-gate, the film passes under a guide roller 27 (Figs. 2 and 6) over a framing roller 28 to the driving sprocket-wheel 29, whose teeth are adapted to engage with the usual sprocket holes in the margins of the film. The film is held in engagement with the sprocket-wheel 29, by the pressure guide roll 30 supported by the arm 31 pivoted on the pin 32, about which is coiled the spring 33 acting between boss 34 on main housing frame 12 and the arm 31. The pressure guide roll 30 thus holds the film in operative relation with the sprocket 29. The film then passes through the slot 35 and the fire trap Q' (Fig. 1) to the take-up reel in its magazine J'.

In order to remove the film from the motion head, the door 36 in the side of the housing 12 of the motion head (Fig. 4) is swung open on its hinges 37; the pressure roll 13 is raised until the toe 14' of the arm 14 is caught and held by the shoulder on spring 38; the film-gate catches 23, are disengaged from their pins 23ª, and the film-gate door 20 is swung back on its hinges 21. The lower pressure guide roll 30 is depressed until the toe 31' of the arm 31 is engaged by the shoulder on spring 39. The film can now be slipped out edgewise from between the rolls 13 and 18, from the film-gate slot 25, from between the sprocket and pressure rolls 29 and 30, and from the motion head as a whole, through the slots 11 and 35 and the door 36.

The light traversing the optical system from the lamphouse H to the screen, passes in a converging beam from the usual lamphouse condensers, through the negative lens 40 (Figs. 2 and 4) which gives a beam of nearly parallel rays through the entrance throat 41 of the motion head housing, which is equipped with the usual fire shutter 52. When fire shutter 52 is opened to position 52ª, the nearly parallel rays from lens 40 pass into the double total reflection prisms R, R, where the beam is split into halves (as explained in connection with the diagrams) so inclined toward each other that passing through the film-gate aperture 42, they cross, as indicated by the center lines 43, in the film plane 44 (Fig. 4) thence passing in diverging beams to the reciprocating total reflection prisms P'' and P''', thence through the moving lens sections M, M, (Figs. 2 and 5) to the stationary lens sections L, L, thence through the lens sections L to the stationary total reflection prisms P' and P', and thence through the openings 45 (Figs. 2, 4, 7, 8 and 11) in the shutter frame 46 and the openings 47 and 48 in the shutter S to the objectives O.

All the moving parts within the motion head are actuated from the crank 50 which is fastened to the crank shaft 49, journaled in the walls of the motion head housing.

The film-driving sprocket 29 is secured to a shaft 29ª, journaled in the walls of the housing, and a helical gear 54, keyed to shaft 29ª, meshes with a helical gear 55 keyed to the crank shaft 49 (Figs. 2 and 6).

When a right handed motion is imparted to the crank 50 and the desired speed has been attained, the friction clutch 51 (Fig. 2) which may be of any convenient type, moves with crank shaft 49 and raises the fire shutter 52 to the position 52ª by means of the flexible band 53. A steady motion is imparted by the crank 50 to the film through the film-gate and motion head as a whole by the sprocket 29, helical gear 54, and helical gear 55, keyed to the crank shaft.

Beyond the sprocket 29 the film is advanced over the guide roll 30, through the slot 35, and fire trap Q' by the rotary motion imparted to the take-up reel arbor W in the take up reel magazine J', by the belt Z driven by the friction pulley 56, which may be mounted on the crank shaft as shown in Fig. 1, or preferably on the sprocket shaft 29ª as shown in Fig. 6. A torsion spring 57 is attached to the shaft 29ª through the collar 58, and engages pin 59 on the friction disk 60, which is free to move on the shaft; thus the friction disk 60 drives the pulley 56, which is also free to move on the shaft. The tension in belt Z being dependent upon the friction between the parts 60 and 56, which depends in turn upon the compression of the spring 57, will obviously be constant, thus the arbor W will turn at such rate as to maintain uniform tension of the film after leaving the sprocket 29.

The moving prisms or reflectors P'', P''', and their moving compensating lenses M, M, are carried on reciprocating cross-heads or frames 61 and 62 (Figs. 4, 5, 9 and 10), provided with sleeves at their ends which slide on vertical posts 70, 70, rigidly mounted in the motion-head housing. Said cross-heads are arranged one above the other, but are so constructed that their respective reflectors and compensating lenses may be raised and lowered to the same levels. To this end the upper cross-head or frame 61 is made with a downwardly offset portion to which its reflector P″ and lens M are secured, and the lower cross-head or frame 62 is made with an upwardly offset portion to which its reflector P″ and lens M are secured (see Fig. 5). Thus the reflector and lens on the lower frame 62 may be moved above those on the upper frame 61, when the frames are brought closest together in their reciprocating movements, and the range of travel of the two side-by-side reflectors and lenses is identical.

A reciprocating motion described above and illustrated in Figs. 21ᵃ to 21ᵇ, is imparted to the frames 61 and 62, sliding on the rods 70, by the cams C′, C″, through the cam rollers 63, 63, mounted on the under sides of frames 61 and 62. The cams are keyed to the shaft 64 which receives its motion through the helical gear 65, from the gear 66 keyed to the sprocket shaft 29ᵃ. All gears are inclosed by the oil chamber 12ᵃ at the side of housing 12, which chamber is closed by the cover plate 12ᵇ. The cam rollers 63 are held in operative relation with the cams C′ and C″ by the arms 67, 67, which are pivoted on the rod 68, and are held down against the cams by the torsion springs 69, 69, acting between the arms 67, 67, and the main housing frame 12. The sliding cross-heads or frames 61 and 62 are provided with two-point bearings (Figs. 9 and 10), and retaining shoes 71 adapted to hold the bearing surfaces of the cross-heads against the rods 70 by means of the compression springs 72.

The reciprocating shutter S is operated from the fly-wheel cam 73, on cam shaft 64, by means of a sliding rack 74, provided with a pin or cam follower 75 which works in the cam groove 73ᵃ of cam wheel 73 (Figs. 7 and 5). The reciprocating motion imparted to the rack 74 by the cam groove 73ᵃ and pin 75 is communicated to the shutter S, through pinion 76, meshing with rack 74, vertical rod 77, to which pinion 76 is fastened, arm 78 fixed to rod 77, and link 79, connecting arm 78 with the shutter S.

The objectives O are secured to the frame 80, which forms part of a cover 12ᶜ over the forward part of the main housing, by means of the plate 81 and the screws 82 (Figs. 2, 4, 7, 8 and 11). The plate 81, being channeled at its center 83, may be bent and drawn in toward the concave face of the frame 80, shown at 84, Fig. 8, thus permitting adjustment of the convergence of the optical axes of the objectives O in order that exact registration may be obtained at different lengths of throw. The objective lenses O are screwed into plate 81. Said cover 12ᶜ also carries the shutter frame 46, and the stationary prisms P′ and compensating lenses L.

Because of poorly made splices in the film it is often necessary to adjust the film with relation to the film-gate aperture 42, in order that a given picture may be properly lined up with its beam-carrying prism; hence some type of framing device should be incorporated in the motion head. Such a device is shown in Figs. 2 and 3. The lever arm 85, pivoted to the pin 86 on the serrated bracket 87, is adapted to move the framing roller 28, through the medium of the link 88 and rod 89, the forward end of which is supported by the swinging arm 90, in such manner as to lengthen or shorten the film path between the film-gate roller 27 and the film sprocket 29. The lever 85 may be locked in any desired position between the limits of its motion by the serrated clamp 91, coöperating with the serrated bracket 87 and operated by lever and handle 92. Thus, to move one picture on the film upward in relation to its prism, that is, independent of its sprocket controlled downward motion, the clamp handle 92 is pressed toward the lever 85 thus removing the serrated clamp face from the face of the bracket 87, and the lever 85 is moved to the left, thereby moving the framing roller 28 to the right and shortening the film path between film-gate roller 27 and film sprocket 29. To lengthen such path the lever 85 is moved in the opposite direction.

In view of the full explanation of the principles of the invention heretofore given in connection with the diagrams, a brief description of the operation of the machine will suffice. Assuming that a film has been "threaded up" in the motion head, as already described, the operator turns the crank 50 in a clockwise direction. As soon as the speed is reached for which the friction clutch 51 is adjusted, the fire shutter 52 is opened and the beam entering the motion head from the lamp house is divided by the double total reflection prisms R, R, into two oblique beams crossing each other at the film. From the film the two divergent beams pass to the moving reflectors P″, P″, thence through the compensating lenses M, L, and M, L, to the fixed reflectors P′, P′, and thence to the objective lenses O, O. The rotation of the crank imparts motion through the mechanism already described to the film driving sprocket 29 to the cams C′, C″, for reciprocating the reflectors P″, P″, and their compensating lenses M, M, and to the shutter actuating cam 73. The cams C′, C″, are so arranged and so formed that while one is traveling downwardly synchronously with the film, the other returns to the upper or starting position to take up the next picture on the film; and the cam 73 is so arranged and formed that it reciprocates the shutter S so as to expose the beam from the downwardly moving image-bearing reflector P'', and to shutter the upwardly moving or returning reflector P''. The parts are so timed as to operate in the manner explained in connection with the diagrammatic figures 21^a—21^h; that is, at the time of shuttering two pictures are in potential register on the screen, namely, the last-to-be-projected picture, which is being progressively shuttered, and the next-to-be-projected picture which is being progressively exposed, so that there is at all times a continuous and uniform illumination of the screen and a complete picture projected thereon. The movement of reflectors P'' with the film produces the virtual effect of a movement of the film away from the objective along its optical axis, and therefore results in no change of position of the projected image on the screen. And the change in length of the optical path is compensated for by one of the above described compensating methods illustrated in Figs. 14 or 17, and preferably by the compensating lens method of Fig. 17, which is the method shown in the drawings of the machine exemplifying the invention.

I claim:

1. In producing motion pictures by projecting light through a moving film and thence through a lens system, the method of maintaining the projected images constant in size, comprising varying the equivalent focal length of the lens system in proportion to the effective distance between the film and the lens system.

2. In producing motion pictures by projecting light through a moving film and thence through a lens system to a screen, the method of maintaining the projected image constant on the screen comprising shifting the conjugate foci of the lens system in proportion to the movement of the film so as to maintain the conjugate foci in the film and screen respectively.

3. The method of producing motion pictures which consists in projecting light through a film while in motion and thence through lenses and varying the equivalent focal length of the lenses to compensate for the movement of the film, thereby to maintain the projected image substantially constant in size.

4. In producing motion pictures by projecting light through a moving film and thence through a lens system to a screen, the method of maintaining the projected image constant on the screen comprising moving parts of the lens system relatively to each other along the optical axis in proportion to the movement of the film.

5. The method of producing motion pictures comprising projecting light through an image-bearing film and thence through a lens system, moving the film relatively to the lens system while projecting light therethrough, and refracting the light in varying degree by moving parts of the lens system relatively to each other along the optical axis so as to compensate for the movement of the film relatively to the lens system.

6. The method of producing motion pictures, which consists in projecting light from a continuously moving image-bearing film as the virtual source from which rays pass in divergent paths, substituting for the image projected by one diverging group of rays the image projected by another diverging group of rays, and compensating for the change in magnitude of the projected image due to the motion of the film in such manner as to maintain the projected image substantially constant in size.

7. The method of producing motion pictures, which consists in projecting light from a continuously moving image-bearing film as the virtual source from which rays pass in divergent paths, substituting for the image projected by one diverging group of rays the image projected by another diverging group of rays, compensating for the change in magnitude of the projected image due to the motion of the film in such manner as to maintain the projected image substantially constant in size, and maintaining continuous illumination of the projected image during the periods of substitution.

8. The method of producing motion pictures, which consists in projecting light from a continuously moving image bearing film as the virtual source from which rays pass in divergent paths, substituting for the image projected by one diverging group of rays, the image projected by another diverging group of rays, compensating for the change in magnitude of the projected image due to the motion of the film in such manner as to maintain the projected image substantially constant in size, and maintaining the two images in potential register during the periods of substitution.

9. The method of producing motion pictures, which consists in projecting light from a continuously moving image bearing film as the virtual source from which rays pass in divergent paths, substituting for the image projected by one diverging group of rays, the image projected by another diverging group of rays, compensating for the change in magnitude of the projected image due to the motion of the film in such manner as to maintain the projected image substantially constant in size, maintaining continuous illumination of the projected image during the periods of substitution, maintaining two images in potential register during the periods of substitution, and projecting a diminishing part of the last-to-be-exposed image and a correspondingly increasing part of the next-to-be-exposed image during said periods of substitution thereby maintaining at all time a complete projected image and a constant illumination.

10. Motion picture apparatus comprising means to move the film continuously, an objective lens, means to project light through the film and lens, a reflector in the path of light adapted to move with the film to maintain an image on the moving film unchanged in position in relation to the virtual optical axis, and means rigidly connected to the reflector to compensate for the motion of the film and nullify the change in magnitude of the projected image due to such motion.

11. Motion picture apparatus comprising means to move the film continuously, an objective lens, means to project light through the film and lens, a reflector in the path of light adapted to move with the film to maintain an image on the moving film unchanged in position in relation to the virtual optical axis, a fixed refractor, and a refractor rigidly connected to the moving reflector coöperating with the fixed refractor to nullify the change in magnitude of the projected image due to such motion.

12. Motion picture apparatus comprising means to move the film continuously, an objective lens, means to project light in divergent groups of rays from the film as the effective source through the respective objective lenses, two reflectors adapted to move alternately with the film in the paths of the diverging groups of image-bearing rays, two fixed refractors, and two refractors rigidly connected respectively to the moving reflectors and coöperating with the fixed refractors to nullify the change in magnitude of the projected images due to such motion.

13. Motion picture apparatus comprising means to move the film continuously, an objective lens, means to project light in divergent groups of rays from the film as the effective source through the respective objective lenses, two reciprocating reflectors adapted to move alternately with the film in the paths of the diverging groups of image-bearing rays, two fixed refractors, and two reciprocating refractors rigidly connected respectively to the moving reflectors and coöperating with the fixed refractors to nullify the change in magnitude of the projected images due to such motion.

14. Motion picture apparatus comprising means to move the film continuously, an objective lens, means to project light in divergent groups of rays from the film as the effective source through the respective objective lenses, two reciprocating reflectors arranged side by side adapted to move alternately with the film in the paths of the diverging groups of image-bearing rays, two fixed refractors, and two refractors rigidly connected respectively to the moving reflectors and coöperating with the fixed refractors to nullify the change in magnitude of the projected images due to such motion.

15. Motion picture apparatus comprising means to move the film continuously, means to project light in divergent rays from the film as the effective source, two reciprocating reflectors adapted to move alternately with the film in the paths of the diverging groups of image-bearing rays, and means to cause said reciprocating reflectors to travel together and in the same direction during the periods of substitution, whereby two successive images will be maintained in potential register while one is being substituted for the other.

16. Motion picture apparatus comprising means to move the film continuously, means to project light in divergent rays from the film as the effective source, two reciprocating reflectors adapted to move alternately with the film in the paths of the diverging groups of image-bearing rays, means for actuating said reflectors, adapted gradually to accelerate the movement of the reflectors from rest to full speed at the beginning of their travel in either direction, and gradually to retard their movement from full speed to rest at the end of their travel in either direction, and also adapted to cause said reciprocating reflectors to travel together and in the same direction during the periods of substitution, whereby two successive images will be maintained in potential register while one is being substituted for the other.

17. Motion picture apparatus comprising means to move the film continuously, means to project light in divergent rays from the film as the effective source, two side-by-side reciprocating reflectors adapted to move alternately with the film in the paths of the diverging groups of image-bearing rays, two frames carrying said two reflectors, and two posts on which said frames are respectively mounted to slide, each frame having two narrow bearing surfaces making sliding engagement with its post and a spring-pressed sliding shoe engaging the post opposite said bearing surfaces, and means to reciprocate said frames on said posts.

Signed by me at Boston, Massachusetts, this 18th day of June 1914.

WILLIAM BURTON WESCOTT.

Witnesses:
ROBERT CUSHMAN,
CHARLES D. WOODBERRY.